US010855597B2

(12) United States Patent
Kwok

(10) Patent No.: US 10,855,597 B2
(45) Date of Patent: Dec. 1, 2020

(54) CHANNEL CODING FOR REAL TIME WIRELESS TRAFFIC

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 48 days.

(21) Appl. No.: 14/754,147

(22) Filed: Jun. 29, 2015

(65) Prior Publication Data

US 2016/0381701 A1 Dec. 29, 2016

(51) Int. Cl.
*H04L 12/801* (2013.01)
*H04L 1/00* (2006.01)
*H04L 29/06* (2006.01)

(52) U.S. Cl.
CPC ............ *H04L 47/14* (2013.01); *H04L 1/0009* (2013.01); *H04L 1/0018* (2013.01); *H04L 1/0041* (2013.01); *H04L 65/80* (2013.01)

(58) Field of Classification Search
None
See application file for complete search history.

(56) References Cited

U.S. PATENT DOCUMENTS

| 4,400,688 | A | * | 8/1983 | Johnston | ............. | H02J 13/0048 |
| | | | | | | 307/140 |
| 6,084,919 | A | * | 7/2000 | Kleider | ................... | H04B 1/707 |
| | | | | | | 375/285 |
| 6,128,472 | A | * | 10/2000 | Harel | ...................... | H04W 4/06 |
| | | | | | | 340/7.21 |
| 6,163,873 | A | * | 12/2000 | Murano | ................ | H03M 13/09 |
| | | | | | | 714/782 |

(Continued)

FOREIGN PATENT DOCUMENTS

| CN | 104205734 A | 12/2014 |
| EP | 2842269 | 10/2013 |
| WO | WO2013163077 | 10/2013 |

OTHER PUBLICATIONS

PCT Search Report and Written Opinion dated Sep. 12, 2016 for PCT Application No. PCT/US16/38003, 17 pages.

(Continued)

*Primary Examiner* — Ayaz R Sheikh
*Assistant Examiner* — Tarell A Hampton
(74) *Attorney, Agent, or Firm* — Lee & Hayes, P.C.

(57) ABSTRACT

Techniques and devices for channel coding real time wireless traffic are described herein. The techniques include initiating communication in an opportunistic network, receiving network performance metrics indicating a Quality of Service or a Quality of Experience, determining a channel coding based on the network performance metrics, and transmitting channel coded data. Network performance met- (Continued)

rics may include indications of packet loss, packet delay, or packet delay jitter. Channel coding algorithms may include turbo encoding, Chase combining, or transmission time interval (TTI) bundling. Using channel coding may allow the recovery of lost or delayed data packets in an opportunistic environment where real time transmission cannot be scheduled or cannot be guaranteed.

20 Claims, 7 Drawing Sheets

(56) References Cited

U.S. PATENT DOCUMENTS

| | | | | |
|---|---|---|---|---|
| 6,973,070 | B1* | 12/2005 | Larghi | H04W 88/02 370/346 |
| 7,706,810 | B1* | 4/2010 | Mitchell | H04L 1/0009 455/456.1 |
| 9,100,937 | B2* | 8/2015 | Seok | H04W 48/16 |
| 2001/0048691 | A1* | 12/2001 | Chang | H04W 72/082 370/442 |
| 2003/0125035 | A1* | 7/2003 | Khafizov | H04W 72/1226 455/450 |
| 2005/0108610 | A1* | 5/2005 | Kim | H04L 1/0041 714/748 |
| 2005/0111371 | A1* | 5/2005 | Miura | H04L 1/1819 370/242 |
| 2006/0013245 | A1* | 1/2006 | Abedi | H04L 12/5693 370/433 |
| 2006/0233280 | A1 | 10/2006 | Tynderfeldt et al. | |
| 2006/0268713 | A1* | 11/2006 | Lundstrom | H04L 47/10 370/235 |
| 2007/0041322 | A1* | 2/2007 | Choi | H04L 1/0003 370/235 |
| 2007/0153745 | A1 | 7/2007 | Sun et al. | |
| 2007/0161377 | A1* | 7/2007 | Kodikara Patabandi | H04W 76/021 455/450 |
| 2008/0192686 | A1* | 8/2008 | Cho | H04W 16/14 370/329 |
| 2008/0259948 | A1* | 10/2008 | Shvodian | H04L 12/40039 370/449 |
| 2009/0143065 | A1* | 6/2009 | Mattila | H04L 41/06 455/423 |
| 2009/0154534 | A1* | 6/2009 | Hassan | H04L 1/0019 375/219 |
| 2011/0070838 | A1* | 3/2011 | Caulfield | H04W 16/14 455/62 |
| 2011/0302473 | A1* | 12/2011 | Zhou | H03M 13/29 714/755 |
| 2012/0324099 | A1* | 12/2012 | Perez Martinez | H04W 4/18 709/224 |
| 2013/0102341 | A1* | 4/2013 | Alapuranen | H04L 1/0026 455/501 |
| 2013/0272170 | A1 | 10/2013 | Chatterjee et al. | |
| 2013/0281089 | A1 | 10/2013 | Chandrasekhar et al. | |
| 2013/0294262 | A1* | 11/2013 | Jose | H04L 72/02 370/252 |
| 2014/0086185 | A1 | 3/2014 | Omar | |
| 2014/0160941 | A1 | 6/2014 | Hui | |
| 2014/0241168 | A1* | 8/2014 | Merlin | H04L 1/0003 370/241 |
| 2015/0181460 | A1 | 6/2015 | Subramanian et al. | |
| 2015/0270925 | A1* | 9/2015 | Lin | H04L 1/0015 370/329 |
| 2015/0312831 | A1* | 10/2015 | Sang | H04W 36/0083 370/236 |

OTHER PUBLICATIONS

The Extended European Search Report dated Jan. 15, 2019 for European Patent Application No. 16818455.4, 12 pages.
Kawata et al, "Impact of Multi-Rate VoIP on Quality of Service in IEEE 802.11e EDCA with Link Adaptation", Proceedings of the 2007 IEEE International Conference on Communication (ICC 2007), pp. 24-28, pp. 392-397, p. 393-394.
An Office Action from the Chinese Patent Office for Application No. 201660037205.4, dated Jun. 16, 2020, a counterpart foreign application of U.S. Appl. No. 14/754,147, 24 pgs.

* cited by examiner

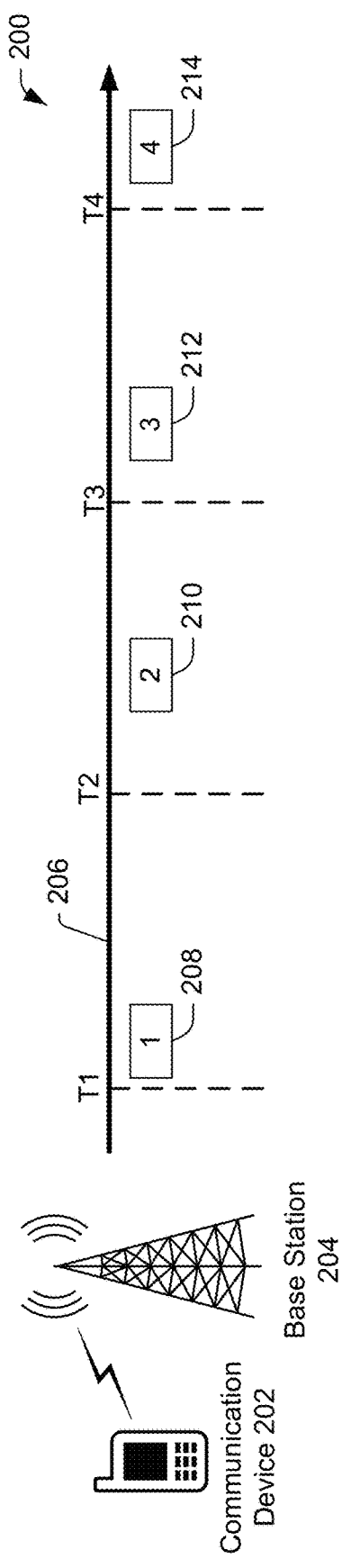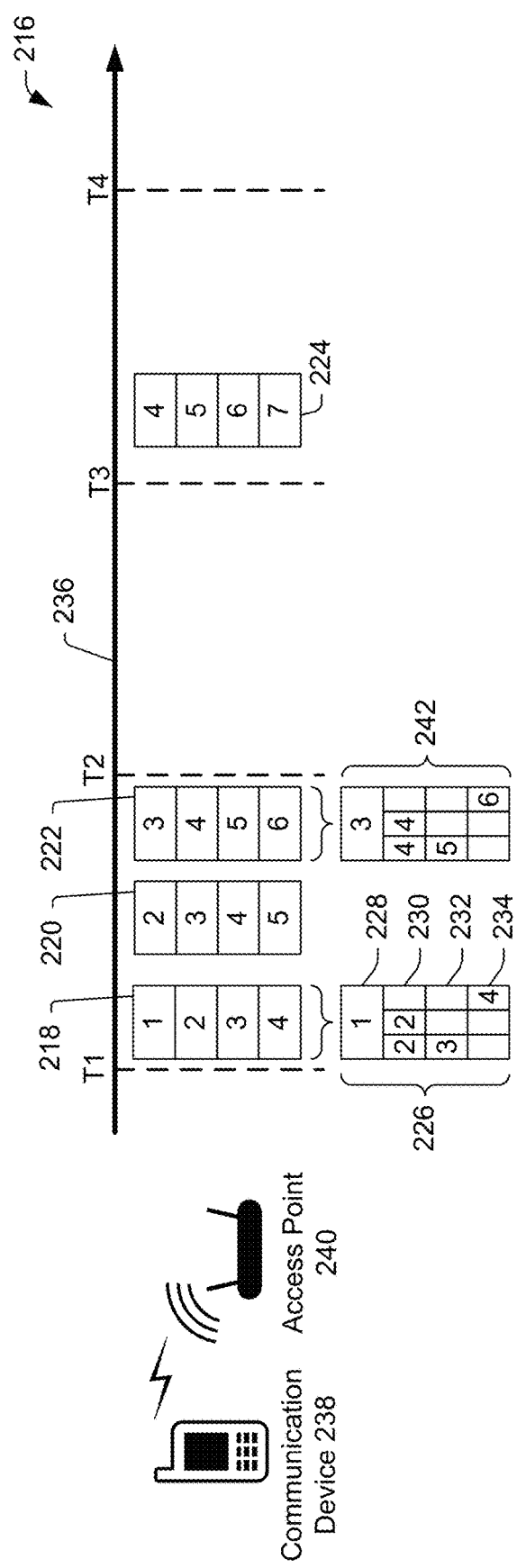
FIG. 2A
FIG. 2B

CHANNEL CODING FOR REAL TIME WIRELESS TRAFFIC

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices that are configured to transmit, receive, relay, and/or route data packets so that data services can be requested by, and provided to, user equipment (UE) subscribed to a plan offered by one or more service providers or network communication providers that implement the telecommunications networks.

Some UEs may be configured to connect to a Wi-Fi network to transmit or receive wireless data. However, the use of a Wi-Fi network may degrade a network's Quality of Service (QoS) and/or an end user's Quality of User Experience (QoE) at the UE because the Wi-Fi networks are not configured for real time wireless traffic (e.g., real time audio and/or video). Rather, the network and the UE may experience unacceptable delay, data communication bottlenecks, network congestion, data transfer overload, etc., making real time communication impractical.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A illustrates an example timing diagram for data packet transmissions in a scheduled transmission environment, in accordance with embodiments of the disclosure.

FIG. 2B illustrates an example timing diagram for data packet transmissions in an opportunistic transmission environment, in accordance with embodiments of the disclosure.

DETAILED DESCRIPTION

The techniques described herein present opportunities for service providers and/or network providers to optimize the Quality of Service (QoS) and/or Quality of User Experience (QoE) for real time voice or video communication over a Wi-Fi network.

In various embodiments, a user equipment (UE) is configured to selectively communicate with a network via multiple types of access points and via multiple communication protocols. When a cellular network is present, the UE may communicate over the cellular network. Cellular networks may provide real time voice or video data transmission by scheduling data transfer to and from the UE and the cellular network. However, when a cellular network and a Wi-Fi network are available, or only a Wi-Fi network is available, the UE may provide communication over the Wi-Fi network. In some embodiments, the Wi-Fi network data exchange may be described as operating in an opportunistic manner, which is to say that no scheduling is provided to guarantee data exchange at regular intervals, at a regular rate, or at a regular throughput. In other words, a UE (e.g., a device) operating on a Wi-Fi network may transmit only when given the opportunity, instead of according to a transmission schedule. While operating in a congested Wi-Fi network, the UE may use channel coding to encode the data packets being transmitted in an opportunistic manner.

In some embodiments, the techniques described herein include receiving a channel and/or timeslot to transmit data, gathering data packets to be sent, applying channel coding to the data packets, and transmitting the data packets in the channel and/or timeslot. In some embodiments, channel coding allows more data to be transmitted than is strictly necessary for real time communication, and/or provides redundant data in data packet transmission. Thus, channel coding may allow real time communication to continue in an opportunistic network when data cannot be regularly scheduled, when packets are lost, or when packets are delayed.

The techniques and systems described herein may be implemented in a number of ways. Example implementations are provided below with reference to the following figures.

Figure 1:
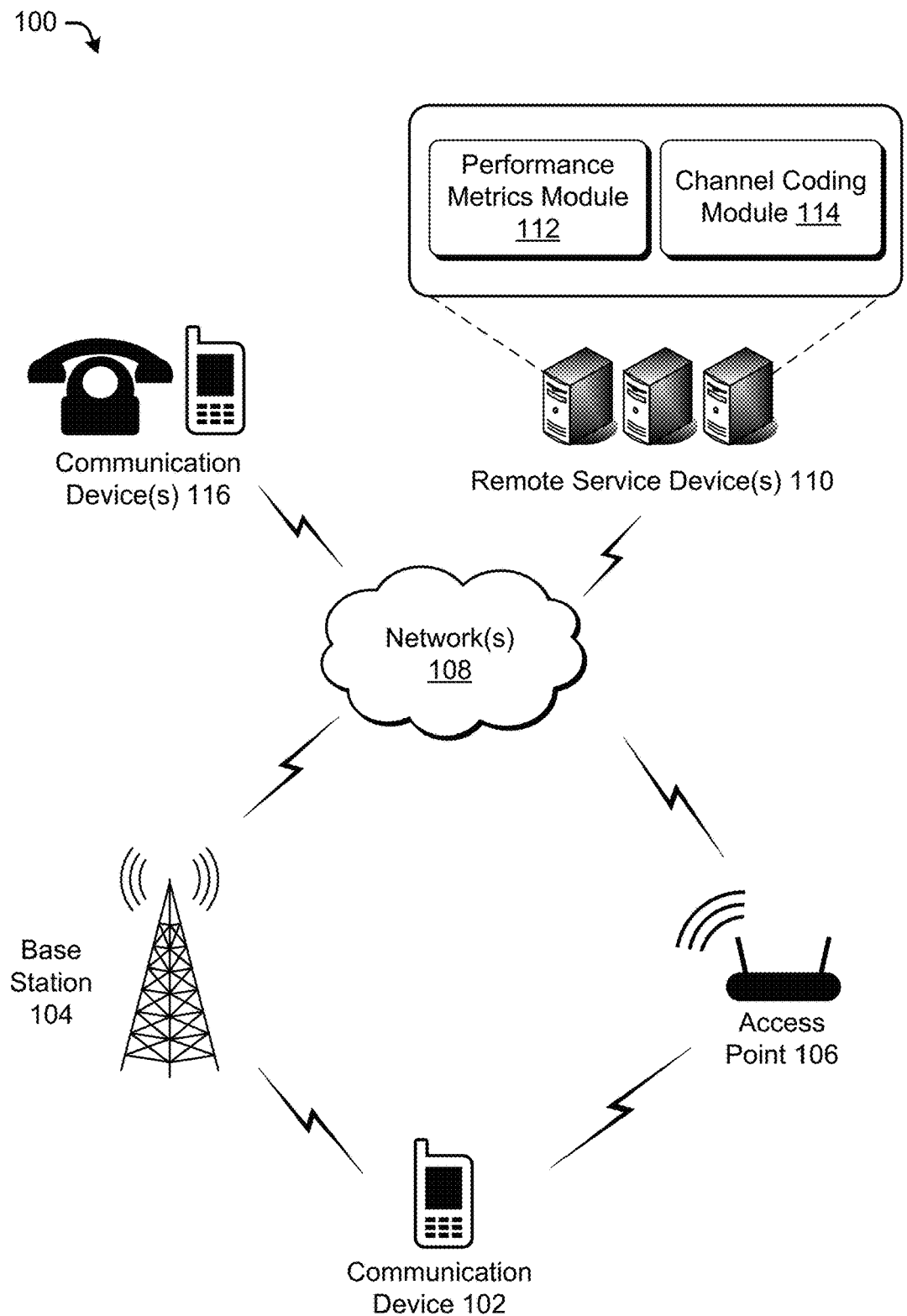
FIG. 1 illustrates an example environment in which a user equipment (UE) may connect to a network using a plurality of access points, in accordance with embodiments of the disclosure.

FIG. 1 illustrates an example environment 100 in which a user equipment (UE) may connect to a network using a plurality of access points, in accordance with embodiments of the disclosure. The environment 100 may include a communication device 102, a base station 104, an access point 106, network(s) 108, remote service device(s) 110 including a performance metrics module 112 and a channel coding module 114, and various communication device(s) 116. In some embodiments, the base station 104, the access point 106, network(s) 108, and the remote service device(s) 110 may be collectively referred to as a mobile telecommunications network (MTN).

The communication device 102 may be referred to as a UE, as mentioned above, and may be any sort of device capable of engaging in wireless communication with other, remote devices. Thus, communication device 102 may include, but is not limited to, smart phones, mobile phones, cell phones, tablet computers, portable computers, laptop computers, personal digital assistants (PDAs), electronic book devices, or any other portable electronic devices that may generate, request, receive, transmit, or exchange voice, video, and/or digital data over the network(s) 108. Communication device(s) 116 may also be referred to as a UE, and may be any sort of devices capable of engaging in wired or wireless communication with other, remote devices, and may include, but are not limited to, smart phones, mobile phones, cell phones, tablet computers, portable computers, laptop computers, personal digital assistants (PDAs), electronic book devices, or any other electronic devices that may generate, request, receive, transmit, or exchange voice, video, and/or digital data over the network(s) 108. The communication device(s) 116 may also include, but are not limited to, wired or wireless devices such as a conventional telephone that may transmit and/or receive analog voice communications. In various embodiments, the communication device 102 may be a transmitting device and the communication device(s) 116 may be a receiving device, and vice versa.

The network 108 may comprise an MTN configured to implement one or more of the second, third, and fourth generation (2G, 3G, and 4G) cellular-wireless access technologies discussed above. Thus, the MTN may implement GSM, UMTS, and/or LTE/LTE Advanced telecommunications technologies. The base station 104, the access point 106, and the remote service device(s) 110 in the GSM, UMTS, LTE, LTE Advanced, and/or HSPA+ telecommunications technologies may include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between the communication device 102 and the communication device(s) 116. The network components may be configured with hardware and software to provide network performance metrics indicating a QoS and/or QoE of the network and/or provide channel coding feedback based on the network performance metrics in order to provide real time communication. While FIG. 1 illustrates base station the 104, the access point 106, the network(s) 108, and the remote service device(s) 110, it is understood in the context of this disclosure, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some embodiments, the base station 104 may include a cellular base station, the network(s) 108 may include a network such as the Internet, the access point 106 may include a Wi-Fi base station (e.g., using a Wi-Fi standard such as 802.11 a/b/g/n/etc.), and in some embodiments, the remote service device(s) 110 may include an evolved packet gateway (e-PDG).

In various embodiments, the communication device 102 may be configured to selectively provide voice, video, and/or data services via the base station 104 and/or the access point 106. For example, when only one of a base station or access point (e.g., base station 104 or access point 106) is available to the communication device 102, the communication device 102 may communicate with the available base station or access point. However, when multiple base stations 104 and/or access points 106 are available to the communication device 102, the communication device 102 may select either the base station 104 or the access point 106 based on a base station or an access point priority, a subscription plan, a user preference, a determination of QoE or QoS provided by each access point, a communication device mode, etc.

The data services and data access applications discussed in this document may include, but are not limited to, web browsing, video streaming, video conferencing, network gaming, social media applications, or any application or setting on the communication device 102 that is configured to generate and exchange data with communication device(s) 116 or other data servers over the network(s) 108.

In some embodiments, the performance metrics module 112 of the remote service device(s) 110 may monitor the network(s) 108 in order to determine a QoS and/or QoE for the communication device 102, for example. In various embodiments, the performance metrics module 112 may monitor network performance metrics such as packet loss, packet delay, or packet delay jitter. In some embodiments, packet loss may be due to congestion and/or bit errors. In some embodiments, packet delay may include an end-to-end delay from a sender to a (final) receiver, while in some embodiments, packet delay may include a round-trip delay. In some embodiments, packet delay jitter may include a variation in delay of a packet within an expected time of arrival.

In some embodiments, the performance metrics module 112 may determine an allowable time delay for each component and/or operation of the network in order to ensure real time communication between the communication device 102 and communication device(s) 116. For example, in order for a user to perceive a communication as a real time communication, a maximum delay between a transmission point (e.g., communication device 102) and a reception point (e.g., communication device(s) 116) for a data packet may be 500 milliseconds (ms). If a total delay of a voice packet is above 500 ms, for example, a user may not perceive a real time communication, but may instead perceive significant delay in the communication, similar to communication via a walkie-talkie, for example. Accordingly, a tolerable total amount of delay may be between 100-200 ms for transmitting a packet from transmission point to a reception point.

In some embodiments, the QoS and/or QoE may be measured in accordance with key performance indicators including, but not limited to, Web page loading time, Domain Name System (DNS) lookup time, Transmission Control Protocol (TCP) connect time, TCP round trip time (RTT), Hypertext Transfer Protocol (HTTP) response time, application start times, searching delay, video start delay, fast forward and rewind delay, a number of buffering events, duration per buffering event, rebuffering ratio, a video frame rate, average/minimum/maximum bit rate, traffic burstiness, amount of data bytes transferred, TCP retransmissions and TCP resets, physical retransmissions, physical RTT, etc. The indicators provided above are presented as examples, and thus, the list is not exhaustive. Rather, service providers and/or network providers may contemplate a large number of different indicators which aid in gauging the QoS and QoE associated with the data services provided.

The performance metrics module 112 may monitor the QoS for each communication device 102 or 116 connected to the network(s) 108 by measuring packet characteristics of the packets in the network. For example, the performance metrics module 112 may measure the network performance metrics of a packet transmitted from the communication device 102 to the access point 106, routed through network(s) 108 and/or remote service device(s) 110, and transmitted to the communication device(s) 116. In some embodiments, the performance metrics module 112 may determine performance networks by receiving direct QoS or QoE feedback from a communication device 102 or 116, while in some embodiments, the performance metrics module 112 may determine performance metrics independent of any feedback from the communication device 102 or 116. In some embodiments, the performance metric module 112 may monitor an uplink transmission from the communication device 102 via the access point 106 and may determine a performance metric of the uplink transmission, and provide that performance metric as feedback to the communication device 102.

In some embodiments, when a real time packet (RTP) is transmitted from the communication device 102 to the communication device(s) 116, the communication device 116 may provide the network performance metrics associated with the RTP to the performance metrics module 112. In some embodiments, the performance metrics module 112 may determine the network performance metrics without feedback from the communication device(s) 116 and/or the communication device 102. In various embodiments, a RTP may refer to one or more data packets associated with real time voice, video, or digital data.

The channel coding module 114 may, in response to the network performance metrics determined by the performance metrics module 112, determine a channel coding to be applied to the data transmitted by the communication device 102, and in some embodiments, the channel coding module 114 may transmit, instruct, request, suggest, or provide as feedback, the determined channel coding algorithm to be used by the communication device 102 to transmit RTPs. In some embodiments, channel coding algorithms may include, but are not limited to, turbo coding, turbo coding with iterative decoding, Chase combining, transmission time interval (TTI) bundling, convolutional coding, rate matching, or low-density parity check (LDPC) coding. In some embodiments, the channel coding module 114 may determine a channel coding algorithm based on feedback from the communication device 102 or 116, while in some embodiments, the channel coding module 114 may determine the channel coding algorithm independent of any feedback from the communication device 102 or 116, and may instead determine the channel coding algorithm based on communication data received from the communication device 102 or 116.

FIG. 2A illustrates an example timing diagram 200 for data packet transmissions in a scheduled transmission environment, while FIG. 2B illustrates an example timing diagram 216 for data packet transmissions in an opportunistic (i.e., unscheduled) transmission environment, in accordance with embodiments of the disclosure.

FIG. 2A illustrates the timing diagram 200 in accordance with transmissions between communication device 202 and base station 204. The communication device 202 may correspond to the communication device 102 of FIG. 1, and the base station 204 may correspond to the base station 104 of FIG. 1, and may refer to a cellular base station. Timing diagram 200 includes a time axis 206 including time intervals T1, T2, T3, and T4, for example. Time intervals T1, T2, T3, and T4 each represent a time frame in which the communication device 202 may transmit a real time packet (RTP) to the base station 204. For example, the time interval between T1 and T2 may correspond to 20 ms. The time interval may depend on a particular coder-decoder (codec) used by the communication device 202.

Base station 204 may communicate with the communication device 202 by scheduling transmission of RTPs within each time interval T1, T2, T3, and T4. That is to say, the base station 204 may allocate or reserve a particular channel and/or timeslot for the communication device 202, which may allow the communication device 202 to regularly schedule RTP transmission, thereby guaranteeing real time communication. For instance, RTP 208 is sent within time interval T1, RTP 210 is sent within time interval T2, RTP 212 is sent within time interval T3, and RTP 214 is sent within time interval T4. As illustrated in FIG. 2A, RTP 208, 210, 212, and 214 may be transmitted anytime within the respective time interval.

In some examples, RTP 208, 210, 212, and 214 may include 65.6 bytes of data and may be encoded using an adaptive multi-rate wideband (AMR-WB) codec at a bit rate of 23.85 kbps. As may be understood in the context of this disclosure, the communication device 202 may use any codec or bit rate.

FIG. 2B illustrates the timing diagram 216 in accordance with transmissions between a communication device 238 and an access point 240. In various embodiments, the communication device 238 may correspond to the communication device 202 of FIG. 2A and/or the communication device 102 of FIG. 1. In some embodiments, the access point 240 may correspond to the access point 106 of FIG. 1, and may refer to a Wi-Fi access point. In some embodiments, data is exchanged between the communication device 238 and the access point 240 in an opportunistic transmission manner.

Although time axis 236 includes time intervals T1, T2, T3, and T4, these time intervals may not refer to time frames allocated by the access point 240, but may instead correspond to the time intervals of time axis 206. That is to say, the time intervals of the time axis 236 may correspond to the time intervals when a communication device would need to transmit RTPs if the communication device were to communicate in a scheduled, real time manner.

However, as discussed above, the access point 240 may not regularly schedule time intervals for the communication device 238 to transmit data, and instead the access point 240 may assign channels and/or timeslots to the communication device 238 on an opportunistic basis. When access point 240 is not congested (i.e., few communication devices are connected to the access point 240, or few resources of the access point 240 are reserved), the communication device 238 may have an opportunity to transmit data packets within each time interval T1, T2, T3, and T4. However, as the access point 240 becomes congested (i.e., many devices are connected to the access point 240 and/or the connected devices are utilizing the resources of the access point 240), the communication device 238 may not have an opportunity to transmit data packets within each time interval T1, T2, T3, and T4. As a non-limiting example illustrated in FIG. 2B, the communication device 238 may not transmit data packets in the time intervals T2 and T4. In conventional systems, the opportunistic transmission of data packets may lead to packet loss, packet delay, and/or delay jitter, which may contribute to reduced QoS and/or QoE.

As illustrated in FIG. 2B, the communication device 238 may use channel coding to generate channel coded RTPs 218, 220, 222, and 224. In some embodiments, the communication device 238 may receive a channel and/or timeslot from the access point 240 in which to transmit data packets. The communication device 238 may then buffer data packets (e.g., packets 1, 2, 3, and 4) to form RTP 218. RTP 218 may include any number of packets. Next, the communication device 238 may transmit RTP 218 to the access point 240, and subsequently, the RTP 218 may be routed through the network(s) 108 and/or the remote service device(s) 110 to its destination at the communication device(s) 116.

Because the access point 240 operates in an opportunistic manner, when the access point 240 is congested, in some embodiments, the access point 240 may not assign a channel and/or timeslot for the communication device 238 to transmit during the remainder of the T1 time interval and/or in the subsequent time intervals T2 and T3. However, in some embodiments, RTP 218 may include more data in a particular time interval than is strictly necessary for real time communication. In this example, because RTP 218 may have buffered multiple data packets (e.g., packets 1, 2, 3, and 4), the access point 240, the remote service device(s) 110, or the communication device(s) 116 may decode the RTP 218 in order to preserve the real time communication (e.g., in order to maintain the QoS or QoE).

In some embodiments, RPT 218 may not include the complete data of some or all of the packets 1, 2, 3, and 4. For example, RTP 226 illustrates an example of channel coding of data packets. As illustrated in FIG. 2B, RTP 226 may include the complete data for packet 228 (packet 1), two thirds of packet 230 (packet 2), one third (the first third) of packet 232 (packet 3), and one third (the last third) of packet 234 (packet 4). RTPs 220, 222, and 224 may be encoded in a similar manner as RTP 218. For example, RTP 222 may be encoded as RTP 242, which may include the complete data for packet 3, two thirds of packet 4, one third of packet 5, and one third of packet 6. In this manner, the channel coding algorithm may send partial packet data, such that the packets may be reconstructed if a particular packet is lost.

For example, considering the case where RTPs 218, 220, and 222 are transmitted by the communication device 238, RTP 220 may not be received (packet loss) or may be received after RTP 222 (packet delay). As discussed above, the communication device 238 may include channel coding such that RTP 218 and 222 may be represented as RTP 226 and 242, respectively. With respect to packet 4, this packet may be reconstructed by the access point 240, the remote service device(s) 110, or the communication device(s) 116 based on the last third of packet 4 received as RTP 234, the first third and middle third of packet 4 received in RTP 242, and a codec employed by the access point 240, the remote service device(s) 110, or the communication device(s) 116. In this manner, real time communication may be preserved despite transmitting on an opportunistic basis, and despite transmissions experiencing packet loss, packet delay, and/or packet jitter.

In some embodiments, the channel coding algorithm used by the communication device 238 may be determined based on the current, historical, or anticipated network performance metrics. In some embodiments, the channel coding algorithm may be determined in part by network performance metrics received from the communication device(s) 116, the remote service device(s) 110, and/or the access point 240. In some embodiments the channel coding algorithm is based on data packets to be sent, and/or may be based on the data packets previously sent. For example, the channel coding for RTP 242 may depend on the channel coding used for RTP 226, for example, to maximize the possibility of recovering data in the event of packet loss, packet delay, and/or delay jitter.

Figure 3:
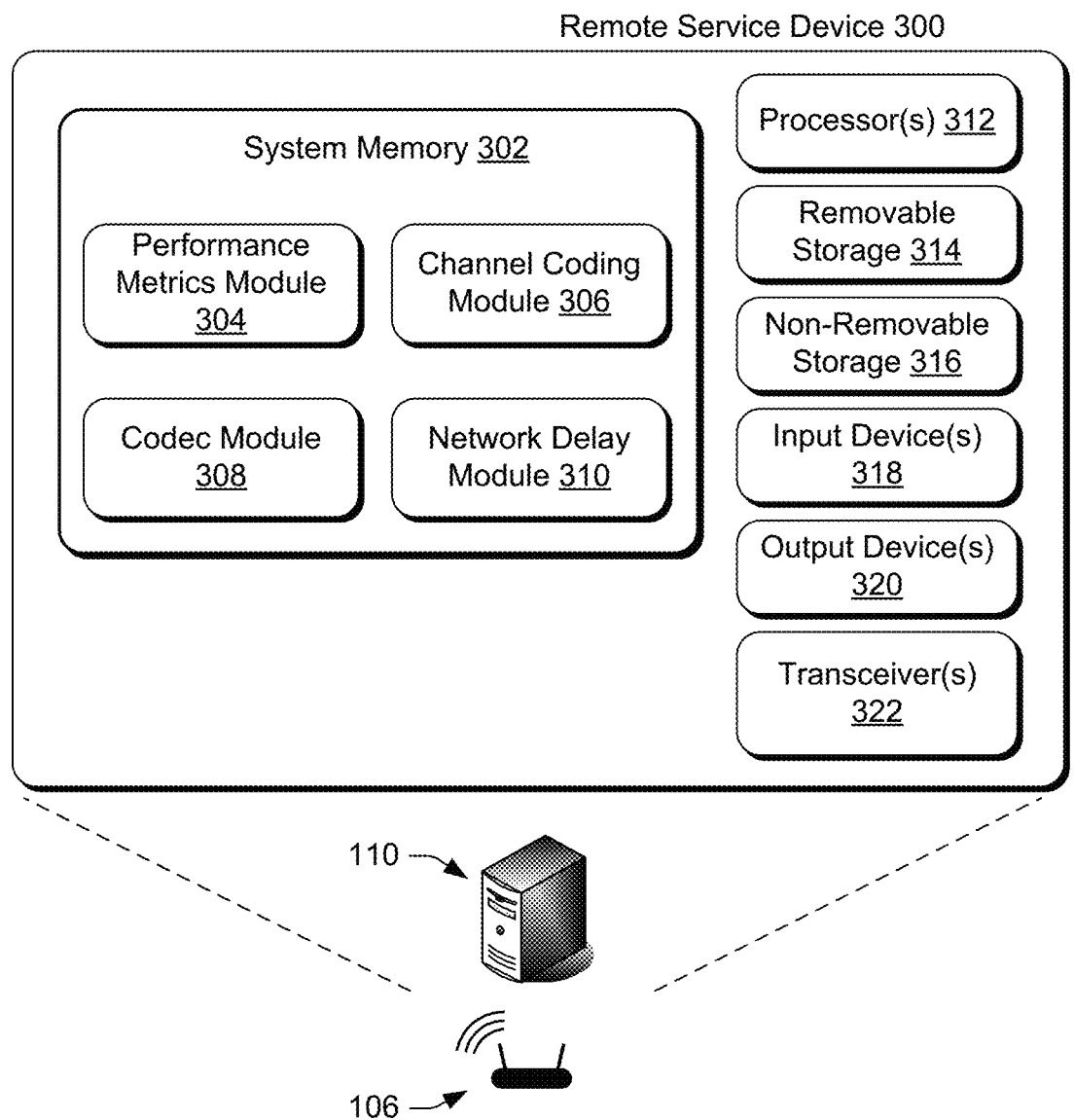
FIG. 3 illustrates an example remote service device configured to provide network performance metrics, in accordance with embodiments of the disclosure.

FIG. 3 illustrates an example remote service device 300 configured to provide network performance metrics, in accordance with embodiments of the disclosure. In some embodiments, the remote service device 300 may correspond to the remote service device(s) 110 or the access point 106 of FIG. 1. While the remote service device 300 is represented as a single device in FIG. 3, it is to be understood in the context of this disclosure that the remote service device 300 may be a plurality of devices with modules and data distributed among them. For example, performance metrics module 304, channel coding module 306, codec module 308, and/or network delay module 310 may be implemented on different devices 300 of the remote service device(s) 110. In some embodiments, the performance metrics module 304 may correspond to the performance metrics module 112 of FIG. 1. In some embodiments, the channel coding module 306 may correspond to the channel coding module 114 of FIG. 1.

As illustrated, the remote service device 300 comprises a system memory 302 storing the performance metrics module 304, the channel coding module 306, the codec module 308, and the network delay module 310. Also, the remote service device 300 includes processor(s) 312, a removable storage 314 and non-removable storage 316, input device(s) 318, output device(s) 320, and transceiver(s) 322.

In various embodiments, system memory 302 is volatile (such as RAM), non-volatile (such as ROM, flash memory, etc.) or some combination of the two. The performance metrics module 304, the channel coding module 306, the codec module 308, and the network delay module 310 stored in the system memory 302 may comprise methods, threads, processes, applications or any other sort of executable instructions. The performance metrics module 304, the channel coding module 306, the codec module 308, and the network delay module 310 may also include files and databases. Further description of the performance metrics module 304 and the channel coding module 306 is provided above in connection with the performance metrics module 112 and the channel coding module 114 of FIG. 1.

The codec module 308 may determine one or more codecs to be used by the communication device 102, 116, 202, and/or 238 when the communication device communicates with the base stations 104 or 204 and/or the access points 106 or 240. In some embodiments, the codec is determined based in part on a current, anticipated, or historical QoS and/or QoE of the network. In some embodiments, the codec is determined based in part on the type of data and/or priority of data to be transmitted or received (e.g., voice, video, and/or digital data).

The network delay module 310 may analyze components and operations of the devices and networks to contribute, in part, to forming accurate and precise assessments of QoS and QoE. In some embodiments, the network delay module 310 may query the communication device 102, the communication device(s) 116, the base station 104, the access point 106, and/or various aspects of the network(s) 108 to determine an actual, anticipated, historical, or average delay. In some embodiments, the network delay module 310 may determine a threshold amount of tolerable delay associated with a particular transmission path or communication device pair. In some embodiments, the network delay module 310 may determine a delay associated with an individual operation, such as a delay associated with transmitting packets from the communication device 102 to the remote service device(s) 110 via the access point 106. In some embodiments, the network delay module 310 may determine the delay associated with an operation, such as a delay associated with transmitting a packet from the remote service device(s) 110 to the communication device(s) 116. In some embodiments, the network delay module 310 may actively query devices for delay data or may passively receive delay data, and in some embodiments the network delay module 310 may estimate delay data (e.g., in the case that the communication device(s) 116 is an analog telephone device incapable of providing feedback). In some cases, the delay data may be pushed to the network delay module 310, or in some case, the delay data may be pulled from the network components.

In some embodiments, the processor(s) 312 is a central processing unit (CPU), a graphics processing unit (GPU), or both CPU and GPU, or other processing unit or component known in the art.

The remote service device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD), content-addressable memory (CAM), or other optical storage, magnetic cassettes, magnetic tape, magnetic disk storage or other magnetic storage devices, or any other medium which can be used to store the desired information and which can be accessed by the remote service device 300. Any such tangible computer-readable media may be part of the remote service device 300.

The remote service device 300 also may include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the remote service device 300 also includes one or more wired or wireless transceiver(s) 322. For example, the transceiver(s) 322 may include a network interface card (NIC), a network adapter, a LAN adapter, or a physical, virtual, or logical address to connect to the network(s) 108 or the base station 104 or the access points 106, for example. To increase throughput when exchanging wireless data, the transceivers 322 may utilize multiple-input/multiple-output (MIMO) technology. The transceiver(s) 322 may comprise any sort of wireless transceivers capable of engaging in wireless, radio frequency (RF) communication. The transceivers 322 may also include other wireless modems, such as a modem for engaging in Wi-Fi, WiMax, Bluetooth, or infrared communication.

Figure 4:
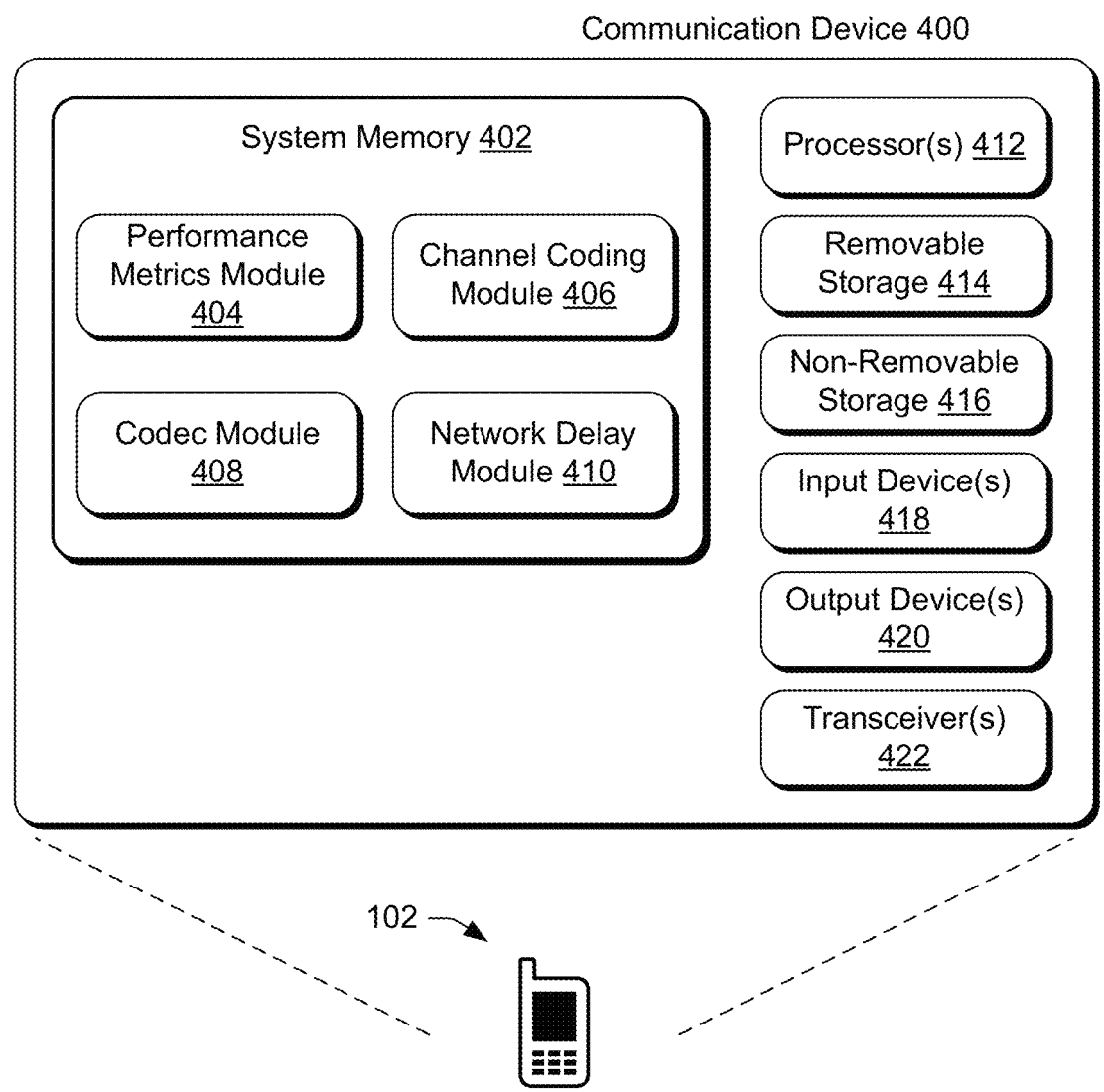
FIG. 4 illustrates an example communication device configured to implement channel coding for real time wireless traffic, in accordance with embodiments of the disclosure.

FIG. 4 illustrates an example communication device 400 configured to implement channel coding for real time wireless traffic, in accordance with embodiments of the disclosure. In some embodiments, the communication device 400 may correspond to the communication device 102 or the communication device(s) 116 of FIG. 1. As illustrated, the communication device 400 comprises a system memory 402 storing a performance metrics module 404, a channel coding module 406, a codec module 408, and a network delay module 410. Also, the communication device 400 includes processor(s) 412, a removable storage 414 and non-removable storage 416, input device(s) 418, output device(s) 420, and transceiver(s) 422. In some embodiments, the communication device may include a microphone, a camera, a GPS, an electronic compass, a heat sensor, biometric sensors, chemical sensors, accelerometer(s), gyroscope(s), pressure sensor(s) and/or photometers.

In various embodiments, system memory 402 is volatile (such as RAM), non-volatile (such as ROM, flash memory, etc.) or some combination of the two. The performance metrics module 404, the channel coding module 406, the codec module 408, and the network delay module 410 stored in the system memory 402 may comprise methods, threads, processes, applications or any other sort of executable instructions. The performance metrics module 404, the channel coding module 406, the codec module 408, and the network delay module 410 may also include files and databases.

In some embodiments, the performance metrics module 404, the channel coding module 406, the codec module 408, and the network delay module 410 may correspond to the performance metrics module 304, the channel coding module 306, the codec module 308, and the network delay module 310 of FIG. 3. In some embodiments, the module operations in the communication device 400 may be performed in parallel with the module operations in the remote service device 300. In some embodiments, various modules may be use to check the processing determined by the other modules.

In some embodiments, the performance metrics module 404 may receive feedback from the remote service device 300 of a QoS of an uplink transmission via the access point 106 to the remote service device 300. In some embodiments, the performance metrics module 404 may determine a QoS of the uplink transmission via the access point 106 to the remote service device 300 by determining a QoS of a downlink transmission from the remote service device 300 to the communication device 400, via the access point 106. Further, the channel coding module 406 may determine a channel coding algorithm based on the feedback received from the remote service device 300, or independent of any feedback received from the remote service device 300.

In some embodiments, the processor(s) 412 is a central processing unit (CPU), a graphics processing unit (GPU), or both CPU and GPU, or other processing unit or component known in the art.

The communication device 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media may include volatile and nonvolatile, removable and non-removable media implemented in any method or technology for storage of information, such as computer readable instructions, data structures, program modules, or other data. System memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the communication device 400. Any such tangible computer-readable media may be part of the communication device 400.

Communication device 400 may include input device(s) 418, such as a keypad, a cursor control, a touch-sensitive display, etc. Also, the communication device 400 may include output device(s) 420, such as a display, speakers, etc. These devices are well known in the art and need not be discussed at length here.

As illustrated in FIG. 4, the communication device 400 may include one or more wired or wireless transceiver(s) 422. In some wireless embodiments, to increase throughput, the transceiver(s) 422 may utilize multiple-input/multiple-output (MIMO) technology. The transceiver(s) 422 may be any sort of wireless transceivers capable of engaging in wireless, radio frequency (RF) communication. The transceiver(s) 422 may also include other wireless modems, such as a modem for engaging in Wi-Fi, WiMax, Bluetooth, or infrared communication. In some embodiments, the transceiver(s) 422 may also identify base station(s) or access point(s) (such as the base station 104 or the access point 106) that the transceiver(s) 422 connect to and may expose those identities to a platform or applications of the communication device 400, such as the performance metrics module 404, the channel coding module 406, the codec module 408, and the network delay module 410.

Figure 5:
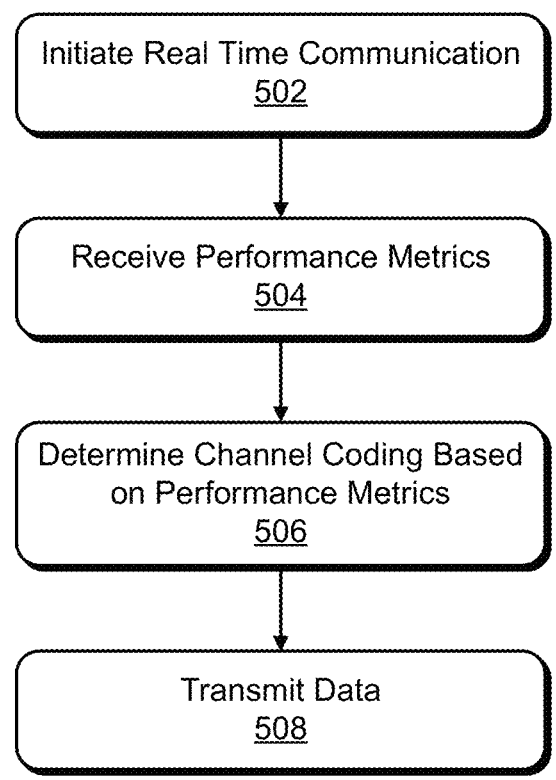
FIG. 5 illustrates an example process for determining channel coding and transmitting data, in accordance with embodiments of the disclosure.
Figure 6:
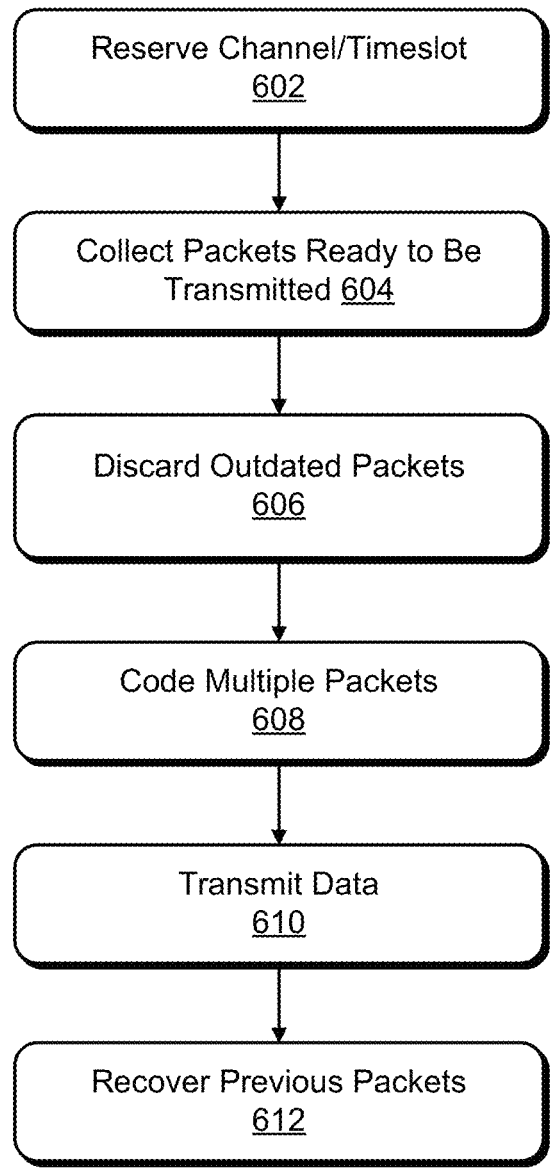
FIG. 6 illustrates an example process for transmitting channel coded data, in accordance with embodiments of the disclosure.
Figure 7:
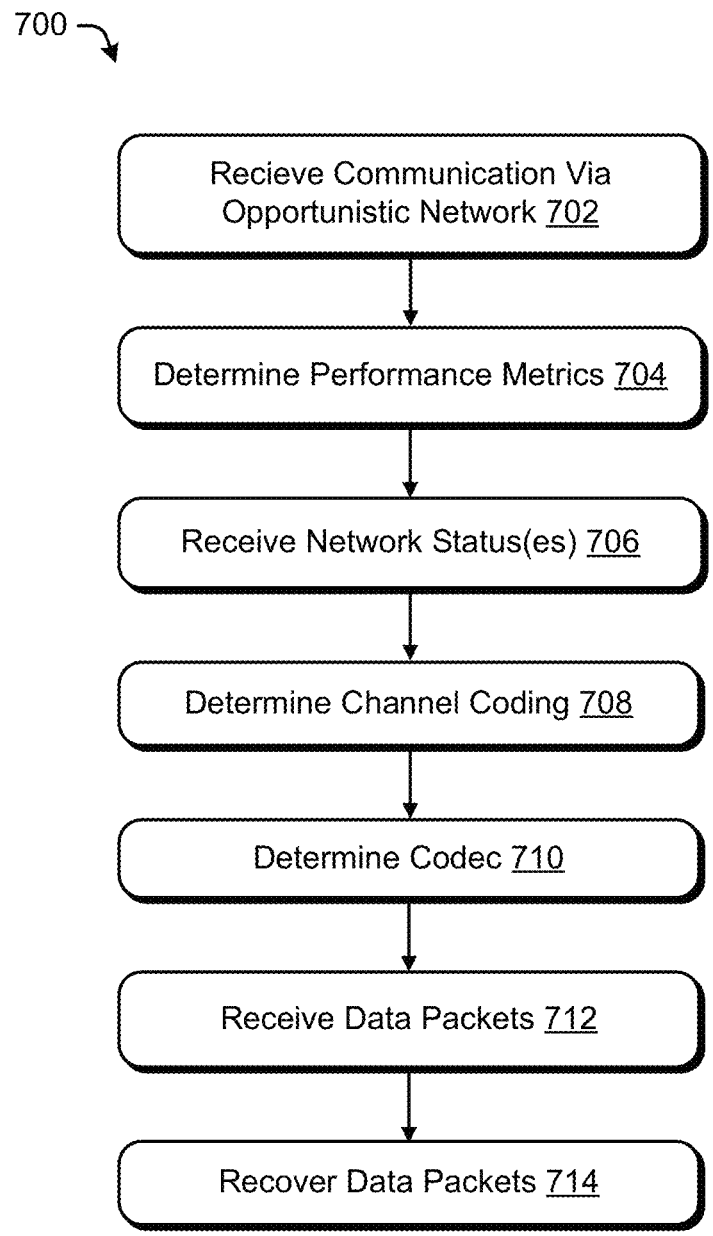
FIG. 7 illustrates an example process for determining performance metrics and channel coding, and receiving channel coded data, in accordance with embodiments of the disclosure.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for determining channel coding and transmitting data, in accordance with embodiments of the disclosure. The example process 500 may be performed by a communication device 102 or 238, for example.

At 502, the process initiates real time communication. This operation may involve initiating a call on a Wi-Fi network, such as when the communication device 102 is connected to a Wi-Fi access point 106, for example. In some embodiments, initiating a real time communication includes initiating a voice communication, a video communication, and/or a communication of digital data.

At 504, the performance metrics are received. The performance metrics received in this operation may be network performance metrics determined by the remote service device(s) 110 or 300, for example. In some embodiments, the performance metrics may reflect a QoS and/or QoE of the real time communication initiated in operation 502. In some embodiments, the received performance metrics may include current network performance metrics, anticipated performance metrics, historical performance metrics, and/or performance metrics associated with one or more other communication devices associated with the access point 106, for example. In some embodiments, the performance metrics may refer to a QoS of an uplink transmission of the communication device 102 or 238 to the remote service device(s) 110 or 300 via the access point 106. In some embodiments, the performance metrics for an uplink transmission of the communication device 102 or 238 may be determined or estimated by determining the performance metrics for a downlink transmission of the communication device 102 or 238.

At 506, the process includes determining channel coding based on the performance metrics received in operation 504. For example, if a particular access point (such as access point 106) is congested, the QoS and/or QoE may suffer. In response, the channel coding may be applied to the real time communication transmitted via the access point operating in an opportunistic manner. As one non-limiting example, channel coding may be applied to real time packets (RTPs) similar to that applied to RTP 218, 220, 222, 224, or RTP 226 and 242 in FIG. 2B. In some embodiments, the channel coding may be based on the number of devices simultaneously connected to the opportunistic access point (e.g., access point 106), and in some embodiments, the channel coding may be based on the codec used in the communication device 102, for example, or the particular performance metric that is degraded. For example, if the performance metrics indicate an increase in packet loss, the channel coding may be selected in order to reconstruct packet data in the event of packet losses. In some embodiments, the channel coding includes, but is not limited to, turbo encoding, Chase combining, and TTI bundling.

At 508, the process transmits data that has been encoded using the channel coding determined in operation 506. In some embodiments, the data is transmitted from the communication device 102 to the access point 106.

In some embodiments, the operations in process 500 are repeated once for each real time communication. In some embodiments, the operations in process 500 are repeated for each transmission opportunity in which the communication device 102 may transmit to the access point 106. For example, process 500 may be performed for each channel and/or timeslot allocated to the communication device 102. In some embodiments, the operations in process 500 may be performed by the communication device 102.

FIG. 6 illustrates an example process 600 for transmitting channel coded data, in accordance with embodiments of the disclosure. The example process 600 may be performed by a communication device 102 or 238, for example.

At 602, a channel and/or timeslot is reserved for data transmission. In some embodiments, the channel and/or timeslot is provided by the access point, such as a Wi-Fi access point 106, in an opportunistic manner. For example, when the access point 106 is congested, there may be no guarantee that the communication device 102 may receive a channel and/or a timeslot sufficient to guarantee a real time voice, video, and/or data communication. In some embodiments, operation 602 includes a request for a channel and/or timeslot by the communication device 102, while in some aspects the channel and/or timeslot is provided by the access point 106.

At 604, packets that are ready to be transmitted are collected. In some embodiments, packets may include real time packets (RTP) that include voice, video, and/or data communications. In some embodiments, operation 604 may collect one or more packets ready to be transmitted. In some embodiments, packets ready to be transmitted may include packets 1-7 of RTPs 218, 220, 222, 224, 226 and/or 242 in FIG. 2B. In some embodiments, packets that are ready to be transmitted correspond to packets that have been generated within a sliding time frame, or may correspond to some or all packets generated after a previous process 600 has been performed (e.g., all packets generated following a previous transmission). In some embodiments, the amount of packets to be collected is based on the codec used by the communication device 102, the size of the channel and/or timeslot reserved in operation 602, or network performance metrics indicating a QoS and/or QoE. In some embodiments, packets that are collected in operation 604 may be buffered in one or more memories, queues, and/or buffers, such as the removable storage 414 or non-removable storage 416 of FIG. 4.

At 606, outdated packets are discarded. In some embodiments, outdated packets are discarded, deleted, or removed from memory in order to reduce the amount of data that needs to be transmitted for real time communications. In some embodiments, data packets are stored in the communication device 102 until the communication device receives an acknowledgement or confirmation that the access point 106, the remote service device(s) 110, and/or the communication device(s) 116 has received a particular data packet. In some embodiments, data packets that have been sent a predetermined number of times may be discarded. For example, in FIG. 2B, packet 3 may be included in RTP 218, 220, and 222 (and also in RTP 226 and 242) in time interval T1, and may be discarded before time interval T3. In some embodiments, packets are discarded when a packet is determined to be above or below a confidence threshold or probability threshold that the packet was received.

At 608, channel coding is applied to multiple packets. In some embodiments, the multiple packets operated on in operation 608 may be the packets collected in operation 604, but without the packets discarded in operation 606. In some embodiments, the channel coding to be applied in operation 608 may include, but is not limited to, turbo coding, turbo coding with iterative decoding, Chase combining, transmission time interval (TTI) bundling, convolutional coding, rate matching, or low-density parity check (LDPC) coding. By way of example, a result of operation 608 may be seen in FIG. 2B as RTPs 218, 220, 222, 224, 226, and/or 242.

At 610, data is transmitted. In some embodiments, operation 610 may correspond to operation 508 in FIG. 5. In some embodiments, data is transmitted by the communication device 102 to the access point 106 in the opportunistic manner as previously described.

At 612, previous packets may be recovered. For example, in some embodiments, operation 612 may be performed throughout a real time communication, may be performed for each opportunistic transmission period, or may be performed for each packet set by the communication device 102. In the event that some previous packets are lost or delayed, operation 612 may include recovering or reconstructing lost or delayed packets based on the transmitted and received packets. By way of example, and without limitation, if RTPs 218, 220, and 222 are sent using process 600, but RTP 220 is lost or delayed, process 600 may recover or reconstruct packet 220 based on the data contained in RTPs 218 and 222, as would be understood by a person of ordinary skill in the art based on this disclosure. In some embodiments, operation 612 may include receiving a request to resend a packet that has been lost or delayed.

FIG. 7 illustrates an example process 700 for determining performance metrics and channel coding, and receiving channel coded data, in accordance with embodiments of the disclosure. In some embodiments, process 700 may be performed by the access points 106 or 240, while in some embodiments, process 700 may be performed by the remote service device(s) 110 or 300. In some embodiments, the access points 106 or 240 may perform the process 700 in parallel with, or as a check to verify the process 700 operating on the remote service device(s) 110 or 300.

At 702, the operation receives communication via an opportunistic network. In some embodiments, the opportunistic network is a Wi-Fi access point 106, or any WAN or LAN that does not provide scheduling for real time communications. In some embodiments, the opportunistic network may not guarantee real time communications. In some embodiments, operation 702 includes receiving voice, video, digital data, and/or a network probe.

At 704, performance metrics are determined. In some embodiments, performance metrics include network performance metrics such as packet loss, packet delay, or delay jitter (i.e., variance), that indicates a QoS or QoE of a real time communication. In some embodiments, determining the performance metrics 704 may include determining a current, anticipated, historical, or average performance metric including at least one network component. In some embodiments, determining the performance metrics 704 may include determining a QoS of an uplink transmission from the communication device 102 or 238 to the remote service device(s) 110 or 300 via the access point 106.

At 706, network status(es) are received. In some embodiments, network statuses may include an identity and/or configuration of each network device involved in a real time communication, such as the communication device 102, the access point 106, the network(s) 108, the remote service device(s) 110, and/or the communication device(s) 116. In some embodiments, the network status(es) may include information regarding the feedback capabilities of a device, an operational status of a device, a current traffic level, a number of devices connected to the device (in the case of an access point), etc. In some embodiments, the received network status(es) 706 may be used in conjunction with or instead of the performance metrics determined in operation 704.

At 708, the channel coding is determined. In some embodiments, the channel coding is determined based on the performance metrics determined in operation 704 and/or the network status(es) received in operation 706. In some embodiments, the channel coding may include, but is not limited to, at least one of turbo coding, turbo coding with iterative decoding, Chase combining, transmission time interval (TTI) bundling, convolutional coding, rate matching, or low-density parity check (LDPC) coding. In some embodiments, operation 708 may include determining whether to use or implement channel coding. In some embodiments, determining a channel coding may depend in part on an amount of network traffic present. For example, as discussed above, in some embodiments, channel coding may include redundant data and/or more data than is strictly necessary to perform real time communications. Thus, operation 708 may determine a channel coding based in part on network traffic levels as to not further reduce QoS or QoE. In some embodiments, information regarding the determined channel coding may be transmitted to a network device such as the communication device 102 or the access point 106. In some embodiments, the performance metrics determined in operation 704 may be transmitted to a network device such as the communication device 102 or the access point 106 in addition to or instead of the channel coding determined in operation 708. In some embodiments, operation 708 may correspond to operation 506 in FIG. 5.

At 710, a codec is determined. In some embodiments, the codec is determined based in part on the determined performance metrics 704, the received network status(es) 706, the determined channel coding 708, an available bandwidth, a type of user equipment (such as communication device 102), a subscription type, an expected QoS and QoE, a data type, and/or signal-to-interference-plus-noise ratio (SINR). In some embodiments, information regarding the determined codec may be transmitted to a network device such as the communication device 102 or the access point 106.

At 712, data packets are received. In some embodiments, data packets are received at the remote service device(s) 110 or 300, while in some embodiments data packets are received at the access point 106. In some embodiments, operation 712 includes verifying that the received data packets are timely, and if the data packets are not timely (e.g., due to packet loss or packet delay), the operations may include discarding one or more packets. In some embodiments, data packets are received and temporarily stored in a buffer before being transmitted to another network device. In some embodiments, data packets are received and are stored in volatile or non-volatile memory. In some embodiments, data packets are received and stored in storage such as removable storage 314 or non-removable storage 316 in FIG. 3.

At 714, data packets are recovered. In some embodiments, process 714 may correspond with process 612 in FIG. 6. In some embodiments, operation 714 may include analyzing the packets received in operation 712 and determining that one or more packets are lost or delayed. As explained above in connection with FIGS. 2B and 6, RTPs sent using channel coding may allow the recovery of lost or delayed data packets in an opportunistic environment where real time transmission cannot be scheduled and/or guaranteed.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A remote service device, comprising:
one or more processors;
a memory; and
one or more modules stored in the memory and executable by the one or more processors to perform operations comprising:
determining at least one network performance metric comprising a packet delay associated with a network;
determining a channel coding for an opportunistic data transmission from a communication device via a Wi-Fi network connection based in part on the at least one network performance metric and one or more of:
a channel provided by an access point for the Wi-Fi network connection; or
a timeslot provided by the access point for the Wi-Fi network connection;
applying the channel coding to the opportunistic data transmission, wherein the channel coding modifies the opportunistic data transmission to comprise one or more real time data packets associated with one or more other opportunistic data transmissions; and
receiving real time data based in part on the channel coding via the opportunistic data transmission, wherein the opportunistic data transmission is an unscheduled data transmission that occurs at discrete opportunities where the channel or the timeslot is available.

2. The remote service device of claim 1, wherein the operations further comprise transmitting the channel coding to the communication device before the communication device performs the opportunistic data transmission.

3. The remote service device of claim 1, wherein the operations further comprise:
determining that one or more data packets was lost or delayed in the opportunistic data transmission; and
recovering the one or more data packets based in part on the channel coding.

4. The remote service device of claim 1, wherein the channel coding includes at least one of turbo encoding, Chase combining, or transmission time interval (TTI) bundling.

5. One or more computer storage devices storing computer-executable instructions configured to program a computing device to perform operations comprising:
determining at least one network performance metric comprising a packet delay associated with a network;
determining a channel coding for an opportunistic data transmission via a Wi-Fi network connection based in part on the at least one network performance metric, and one or more of:
a channel provided by an access point for a Wi-Fi network connection; or
a timeslot provided by the access point for the Wi-Fi network connection;
applying the channel coding to the opportunistic data transmission, wherein the channel coding modifies the opportunistic data transmission to comprise one or more real time data packets associated with one or more other opportunistic data transmissions; and
receiving real time data based in part on the channel coding via the opportunistic data transmission, wherein the opportunistic data transmission is an unscheduled data transmission that occurs at a discrete opportunity where the channel or the timeslot is available.

6. The one or more computer storage devices of claim 5, wherein the channel coding includes at least one of turbo encoding, Chase combining, or transmission time interval (TTI) bundling.

7. The one or more computer storage devices of claim 5, wherein the at least one network performance metric indicates a Quality of Service of an uplink transmission from a communication device to a remote service device, and wherein the operations further comprise transmitting the at least one network performance metric or the channel coding to the communication device.

8. The one or more computer storage devices of claim 5, wherein the real time data is at least one of voice data or video data.

9. The one or more computer storage devices of claim 5, wherein the operations further comprise determining a tolerable transmission time delay for the opportunistic data transmission.

10. The one or more computer storage devices of claim 5, wherein the operations further comprise:
determining at least one missing packet of the real time data; and
reconstructing the at least one missing packet from the channel coding.

11. The one or more computer storage devices of claim 5, wherein the operations further comprise:
receiving an updated network performance metric;
determining an updated channel coding based in part on the updated network performance metric; and
transmitting the updated channel coding.

12. The one or more computer storage devices of claim 5, wherein the operations further comprise:
   determining at least one missing packet of the real time data; and
   requesting a retransmission of the at least one missing packet.

13. The one or more computer storage devices of claim 5, wherein the operations further comprise transmitting the at least one network performance metric to a communication device.

14. A device, comprising:
   one or more processors;
   one or more memories; and
   one or more modules stored in the one or more memories and executable by the one or more processors to perform operations comprising:
      receiving at least one network performance metric comprising a packet delay associated with a network;
      determining a channel coding for an opportunistic data transmission over a Wi-Fi network connection based in part on the at least one network performance metric and one or more of:
         a channel provided by an access point for the Wi-Fi network connection; or
         a timeslot provided by the access point for the Wi-Fi network connection;
      applying the channel coding to the opportunistic data transmission, wherein the channel coding modifies the opportunistic data transmission to comprise one or more real time data packets associated with one or more other opportunistic data transmissions; and
      transmitting real time data based in part on the channel coding via the opportunistic data transmission over the Wi-Fi network connection, wherein the opportunistic data transmission is an unscheduled data transmission that occurs at a discrete opportunity where the channel or the timeslot is available.

15. The device of claim 14, wherein the at least one network performance metric further includes a Quality of Service of an uplink transmission of the device to a remote service device via the Wi-Fi network connection.

16. The device of claim 14, wherein the channel coding includes at least one of turbo encoding, Chase combining, or transmission time interval (TTI) bundling.

17. The device of claim 14, wherein the operations further comprise:
   transmitting the channel coding to a communication device associated with the network before the communication device performs the opportunistic data transmission.

18. The device of claim 14, wherein the operations further comprise:
   determining that one or more data packets was lost or delayed in the opportunistic data transmission; and
   recovering the one or more data packets based in part on the channel coding.

19. The one or more computer storage devices of claim 5, wherein the operations further comprise transmitting the channel coding to a communication device before the communication device performs the opportunistic data transmission.

20. The device of claim 14, wherein the operations further comprise:
   receiving an updated network performance metric;
   determining an updated channel coding based in part on the updated network performance metric; and
   transmitting the updated channel coding.

\* \* \* \* \*